(12) United States Patent
McMillan et al.

(10) Patent No.: US 9,785,154 B2
(45) Date of Patent: Oct. 10, 2017

(54) RECONFIGURABLE MODULAR FLUID FLOW CONTROL SYSTEM FOR LIQUIDS OR GASES

(71) Applicants: Robert M. McMillan, Georgetown, TX (US); Edwin Lee Hankinson, Georgetown, TX (US)

(72) Inventors: Robert M. McMillan, Georgetown, TX (US); Edwin Lee Hankinson, Georgetown, TX (US)

( * ) Notice: Subject to any disclaimer, the term of this patent is extended or adjusted under 35 U.S.C. 154(b) by 0 days.

(21) Appl. No.: 15/431,048

(22) Filed: Feb. 13, 2017

(65) Prior Publication Data
US 2017/0153652 A1    Jun. 1, 2017

(51) Int. Cl.
*G05D 7/06* (2006.01)
*G01F 15/00* (2006.01)

(52) U.S. Cl.
CPC ......... *G05D 7/0635* (2013.01); *G01F 15/005* (2013.01); *Y10T 137/7759* (2015.04); *Y10T 137/7761* (2015.04); *Y10T 137/87885* (2015.04)

(58) Field of Classification Search
CPC ......... Y10T 137/7759; Y10T 137/7761; Y10T 137/87885; G05D 7/0635; G01F 15/005
USPC ..................................... 137/486, 487.5, 884
See application file for complete search history.

(56) References Cited

U.S. PATENT DOCUMENTS

| | | | | |
|---|---|---|---|---|
| 3,457,943 A * | 7/1969 | Kawabata | ........... | F15B 13/0817 137/269 |
| 4,247,047 A * | 1/1981 | Schaming | ................. | B05B 1/16 134/198 |
| 4,387,739 A * | 6/1983 | Schaming | ............... | B21B 27/10 137/884 |
| 5,025,834 A * | 6/1991 | Stoll | .................... | B23Q 1/0009 137/271 |
| 5,080,131 A * | 1/1992 | Ono | ..................... | G01F 1/6842 137/486 |
| 5,094,430 A * | 3/1992 | Shirai | ................... | F16K 31/007 251/129.06 |
| 5,107,897 A * | 4/1992 | Stoll | ....................... | B23Q 1/03 137/271 |
| 5,180,318 A * | 1/1993 | Moller | ............... | F15B 13/0817 137/884 |
| 5,730,181 A * | 3/1998 | Doyle | ................ | B01D 53/0415 137/487.5 |
| 6,044,701 A * | 4/2000 | Doyle | .................. | G05D 7/0635 73/202 |

(Continued)

*Primary Examiner* — William McCalister
(74) *Attorney, Agent, or Firm* — Barry Choobin; Patent 360

(57) ABSTRACT

The embodiments herein discloses a linear seal system for interconnecting flow controller modules in a fluid flow controller. The system comprises a flow sensing module is coupled to an inlet connection module to measure a fluid flow rate to generate a sensor output signal. A flow control valve module is coupled to the flow sensing module to provide a user desired flow rate through an outlet connection module. An electronic control system is configured to regulate an operation of the flow sensing module and the flow control valve module based on the command signal to achieve a desired flow rate. A linear track system provided to support all the modules in a linear arrangement, includes a dovetail locking configuration. The linear track has two rod/screws to compress the seals between the modules.

12 Claims, 10 Drawing Sheets

(56) References Cited

U.S. PATENT DOCUMENTS

| | | | |
|---|---|---|---|
| 6,152,162 A * | 11/2000 | Balazy | G05D 7/0635 137/110 |
| 6,231,260 B1 * | 5/2001 | Markulec | F16K 27/003 137/884 |
| 6,394,138 B1 * | 5/2002 | Vu | C23C 16/44 137/597 |
| 6,539,968 B1 * | 4/2003 | White | G05D 7/0635 137/10 |
| 6,543,466 B2 * | 4/2003 | Gill | G05D 7/0635 137/10 |
| 6,769,463 B2 * | 8/2004 | Vu | F16K 27/003 137/486 |
| 6,826,953 B2 * | 12/2004 | Wang | G01F 5/00 73/202.5 |
| 7,222,029 B2 * | 5/2007 | Larson | G01F 1/688 702/45 |
| 7,409,871 B2 * | 8/2008 | Wang | G01F 1/6847 702/100 |
| 7,748,268 B2 * | 7/2010 | Lull | G01F 1/684 73/204.22 |
| 8,307,854 B1 * | 11/2012 | Vu | F16K 27/003 137/884 |
| 8,573,247 B2 * | 11/2013 | Ushigusa | G01F 1/36 137/486 |
| 2002/0020445 A1 * | 2/2002 | Hettinger | F15B 13/0814 137/270 |
| 2002/0031417 A1 * | 3/2002 | Hoshi | F16K 27/003 414/14 |
| 2003/0061888 A1 * | 4/2003 | Gould | G01F 1/36 73/861.52 |
| 2006/0037644 A1 * | 2/2006 | Nishikawa | G05D 7/0641 137/487.5 |
| 2006/0144849 A1 * | 7/2006 | Bezema | B05C 5/02 222/1 |
| 2007/0089788 A1 * | 4/2007 | Chinnock | G01F 1/363 137/487.5 |
| 2009/0242040 A1 * | 10/2009 | Kees | F15B 13/0814 137/315.09 |
| 2009/0301592 A1 * | 12/2009 | Mueller | F16K 27/003 137/884 |
| 2010/0101664 A1 * | 4/2010 | Yamamoto | F16K 7/045 137/486 |

\* cited by examiner

RECONFIGURABLE MODULAR FLUID FLOW CONTROL SYSTEM FOR LIQUIDS OR GASES

BACKGROUND

Technical Field

The embodiments herein are generally related to a flow measurement and control systems. The embodiments herein are more particularly related to a reconfigurable and modular flow control system for fluids. The embodiments herein are more particularly related to a reconfigurable and modular flow control system for fluids with a linear seal arrangement.

Description of the Related Art

Flow controllers include flow control valves that are used to regulate the flow or pressure of a fluid. The flow controllers are configured to respond to signals generated by independent devices such as flow meters or temperature gauges or user commands. The existing flow control valves and flow components used for proportional flow control applications have certain limitations, shortcomings or inadequacies. The proportional solenoid operated valves or a diaphragm valves used in the flow controller have rapid operating speed. However, there are problems in programming the solenoid and diaphragm valves inexpensively for an accurate flow control under widely varying flow conditions.

The rotatable control valves typically have good flow control resolution and hold flow set points. However, the rotatable control valves are slow to respond. Further, the rotatable control valves have problems in achieving high resolution over a wide range of flow rates in a relatively small valve size. In addition, the programming of the valves, or associated flow components, for an accurate flow control over a wide variety of flow conditions is often a problem.

The designs of valves other than the rotatable control valves often include a diaphragm actuation for flow control and generally use a relatively expensive diaphragm structure. Existing flow control systems do not provide precision programming features for widely varying flow conditions. Further, the existing flow controllers do not provide easily replaceable components that are easily reconfigured for different flow conditions. Also, many existing flow control systems utilize a surface mounting manifold base which while providing some ease of component changing, does not allow for flow path order changes or optimization, chemical compatibility variations, or for minimum interconnecting internal flow volumes.

In view of the above discussion, there is felt a need for a linear system for a flow controller that requires no manifold. Further, there exists a need for a seal system for a flow controller that enables easy arrangement and replacement of modules in the flow controller. Furthermore, there exists a need for a seal system for a flow controller that provides simple and effective seal between modular components. Yet there is a need for a reconfigurable dynamic flow control system for fluids with a linear track arrangement and a linear seal arrangement.

The above mentioned shortcomings, disadvantages and problems are addressed herein and which will be understood by reading and studying the following specification.

OBJECTS OF THE EMBODIMENTS

The primary object of the embodiments herein is to provide a precision linear seal system for a flow controller.

Another object of the embodiments herein is to provide a precision linear seal system suitable for interconnection of flow controller modules in a liquid or gas flow controller.

Yet another object of the embodiments herein is to provide a system with simple linear seal arrangement that requires no manifold, no interconnection tubes and tube fittings.

Yet another object of the embodiments herein is to provide a precision linear seal system for a flow controller that enables easy arrangement and replacement of modules in the flow controller.

Yet another object of the embodiments herein is to provide a precision linear seal system for a flow controller that provides simple and effective seal between modular components in the flow controller.

Yet another object of the embodiments herein is to provide a precision linear seal system with a linear track system that is configured to support at least one of the inlet connection module, the flow sensing module, the flow control valve module, and the outlet valve module in a linear arrangement.

Yet another object of the embodiments herein is to provide a linear track system for a flow controller with a dovetail locking configuration.

Yet another object of the embodiments herein is to provide a linear track system for a flow controller that utilizes one of a simple two rod or a two screw system to compress the seals between each interface of the modules.

Yet another object of the embodiments herein is to provide a linear track system for a flow controller with an inverted T shaped linear track.

Yet another object of the embodiments herein is to develop a special linear track to provide a defined orientation and location for the seal between each module.

Yet another object of the embodiments herein is to provide a linear track to allow removal and re-installation of the same or different modules without compromising the seal integrity of the flow control system.

Yet another object of the embodiments herein is to provide a linear track that allows for a sliding motion so as to add, change or remove a module.

Yet another object of the embodiments herein is to provide a linear track to establish a correct orientation and location for the seal, so as to produce a leak free connection for the fluid flowing between modules.

Yet another object of the embodiments herein is to provide a precision linear seal track system to enable a precision sealing of the flow modules as well as for a variety of interchangeable modules, without requiring a large flow manifold or additional mounting hardware to a manifold.

Yet another object of the embodiments herein is to develop a precision linear seal track system to provide reliable and simple precision seals.

Yet another object of the embodiments herein is to develop a precision linear seal track system to provide simpler seal features at each seal connection Yet another object of the embodiments herein is to develop a precision linear seal track system to properly compress the seal connections in an easy manner.

Yet another object of the embodiments herein is to provide a precision linear seal track system to change a module easily.

Yet another object of the embodiments herein is to develop a precision linear seal track system to have a large number of variations of flow Modules and a large number of modules, yet with an ease of interchanging, on the same track.

Yet another object of the embodiments herein is to provide a precision linear seal track system to have a low dead volume and low total volume in the inter-module connection, as compared to a traditional manifold systems.

Yet another object of the embodiments herein is to develop a precision linear seal track system to accommodate a wide variety of flow conditions such as material compatibility with the fluid (liquid or gas), pressures, flow sensing technology, flow connection requirements, and flow ranges etc.

Yet another object of the embodiments herein is to provide a linear track system with linear seal arrangement that requires no manifold, no interconnection tubes and tube fittings.

Yet another object of the embodiments herein is to provide a precision linear seal system for enabling easy arrangement and replacement of modules in the flow controller.

Yet another object of the embodiments herein is to provide a precision linear seal system for a flow controller for providing simple and effective seal between modular components in the flow controller.

These and other objects and advantages of the embodiments herein will become readily apparent from the following detailed description taken in conjunction with the accompanying drawings.

SUMMARY

The various embodiments herein provide a precision linear seal system for a flow controller. The precision linear seal system herein is suitable for interconnection of flow controller modules in a liquid or gas flow controller. According to an embodiment herein, the system provides simple linear seal arrangement that requires no manifold, no interconnection tubes and tube fittings. The precision linear seal system for a flow controller enables easy arrangement and replacement of modules in the flow controller. The precision linear seal system for a flow controller provides simple and effective seal between modular components in the flow controller. The precision linear seal system includes a linear track system that is configured to support the inlet connection module, the flow sensing module, the flow control valve module, and the outlet valve module in a linear arrangement. The linear track system for a flow controller includes a dovetail locking configuration. The linear track system for a flow controller utilizes one of a simple two rod or a two screw system to compress the seals between each interface of the modules.

According to an embodiment herein, a reconfigurable, dynamic fluid flow control system for liquids or gases is provided. The system comprises an inlet connection module comprising a fluid inlet to receive a fluid. A flow sensing module is coupled to the inlet connection module. The flow sensing module is configured to measure a flow rate of the fluid to generate a sensor output signal. A flow control valve module is coupled to the flow sensing module. The flow control valve module is configured to provide a desired flow rate. The desired flow rate is set by a user. An outlet connection module is coupled to the flow control valve module. The outlet connection module is configured to deliver the desired flow rate. An electronic control system is configured to regulate an operation of the flow sensing module and the flow control valve module. The electronic control system is configured to receive a user input data and commands through an input device. The electronic control system is configured to receive the user input data and the sensor output signal to generate an output command signal for controlling an operation of the flow control valve to achieve a desired flow rate. A seal system is configured to provide a sealing among an interconnection point between any two of the inlet connection module, the flow sensing module, the flow control valve module, and the outlet valve module to prevent a leakage of fluids. A linear track system is arranged to provide a desired orientation and location of the inlet connection module, the flow sensing module, the flow control valve module and the outlet valve module in a linear arrangement. The linear track system is configured to retain the inlet connection module, the flow sensing module, the flow control valve module, and the outlet valve module with a dovetail locking configuration.

According to an embodiment herein, the linear track system comprises a platform, two stoppers, two rods and screws. The platform is formed in a dovetail locking configuration for receiving and storing each module.

According to an embodiment herein, the dovetail configuration in the linear track is one of angular with sixty degree slope on each side.

According to an embodiment herein, the linear track is formed in a rectangular shape with a recess or track formed in the center. The track is formed in an inverted T shape.

According to an embodiment herein, the linear track system comprises two stoppers provided at distal end of the platform. Each of the two stoppers are provided with two holes for receiving two rods. The two rods are passed through the two stoppers and tightened and fastened with the two stoppers through the two screws to keep a plurality of seals placed between the inlet connection module, the flow sensing module, the flow control valve module, and the outlet valve modules intact and in a compressed condition to maintain a seal integrity.

According to an embodiment herein, the linear track system is fabricated of materials selected from a group consisting of aluminum, steel, fiber reinforced plastics, Polytetrafluoroethylene (PTFE) and brass.

According to an embodiment herein, a bottom surface of each of the inlet connection module, the flow sensing module, the flow control valve module, and the outlet valve module is formed in dovetail configuration for interlocking with the dovetail configuration on the linear track system.

According to an embodiment herein, each of the inlet connection module, the flow sensing module, the flow control valve module, and the outlet valve module is mounted on the linear track system and replaced on demand.

According to an embodiment herein, the seal system comprises a first seal arranged between the inlet connection module and the flow sensing module, a second seal arranged between the flow sensing module and the flow control valve module, and a third seal arranged between the flow control valve module and the outlet valve module.

According to an embodiment herein, the electronic control system comprises a summation logic, a calibration table, a control logic device and a PID control device. The summation logic is designed or configured to receive an input from the user and the flow sensing module.

According to an embodiment herein, the control logic device is configured to compare an input from the summation logic and the flow sensing module calibration table to generate a control signal for achieving the desired flow rate.

According to an embodiment herein, the PID control device is configured to receive the output control signal to generate the output command signal. An opening of the flow control valve is controlled through an actuator or electromagnetic relay based on the output command signal.

According to an embodiment herein, the linear track system is a long metal bar with a dove tail configuration for interlocking each module.

According to an embodiment herein, the input device is selected from a group consisting of touch pad, user interface and key pad.

According to an embodiment herein, a precision linear seal system for a flow controller providing variable flow rate in fluids is disclosed. The system includes an inlet connection module comprising a fluid inlet to receive fluid. The system includes a flow sensing module coupled to the inlet connection module. The flow sensing module is configured to determine the flow rate and generate a sensor signal. The system includes a flow control valve module coupled to the flow sensing module. The flow control valve module is configured to provide a plurality of mutually different flow rates as commanded by a user input. The system includes an outlet connection module coupled to the flow control valve module. The outlet connection module is configured to deliver fluid at a desired rate. The system includes an electronic system coupled to an input module, the flow sensing module, and the flow control valve module. The electronic system is configured to receive the user input from the input module. The electronic system is configured to receive the sensor signal to generate an output signal to program the flow control valve. The system further includes a linear track system that is configured to support the inlet connection module, the flow sensing module, the flow control valve module, and the outlet valve module in a linear arrangement. The linear track system retains the inlet connection module, the flow sensing module, the flow control valve module, and the outlet valve module with a dovetail locking configuration. The linear track system further utilizes a simple two rod and screw system to compress the seals placed between each interface of the modules.

The Flow controller is configured to maintain a consistent and stable known flow rate for fluids (liquids or gases). The Flow controller is configured to receive a command for specific (preset) flow rate or for a specific (preset) total flow of the liquid or gas, to produce a desired flow rate.

The flow control system include the inlet connection module, the outlet connection module, a flow sensing mechanism that produces an electrical signal proportional to the measured or sensed fluid flow rate, and a flow control valve. The flow control valve is adjusted through an actuator or relay which is controlled with a command signal from a control logic. The electronic system servo control device is configured to provide a closed loop control. The input data or setting provided by the user is compared to the value derived from the flow sensor output to send a command to adjust the (proportional) flow control valve to achieve the desired or preset flow rate.

The flow control system comprises an inlet connection for receiving a liquid or gas to the flow controller. The gas or liquid supply or source must be connected to a pressure source to make the fluid to flow into the flow controller through an inlet tube or port. The pressure for the fluid is developed by using a tank of compressed gas, a cover gas with pressure over a liquid container to pressurize the liquid, gravity feed, or a pump feed is used. The pressure source is not part of the flow controller, but is needed to supply the fluid to the flow controller.

Subsequently, the inlet module supplies fluid to the flow sensing module. The flow sensing module measures or estimates the fluid flow rate, and produces an electrical output signal corresponding to the measured flow rate of the fluid. The output fluid flow from the flow sensing module is supplied to the flow control valve module. The flow control valve module includes an adjustable flow restriction or flow control valve capable of adjusting a flow rate to a desired degree or level based on a received command signal from a control logic device. The flow control valve module is provided with at least one of mechanical actuators, to open and close flow passage for a desired fluid (liquid or gas) flow rate. Examples of actuators include but not limited to an electromagnet or solenoid, or piezoelectric, or a motor or other suitable device. The flow control valve module passes the fluid into the Outlet module or port, which further delivers the fluid to the customer flow application.

According to an embodiment herein, the electronic circuit system which is a part of the flow controller, is connected electronically to the "flow sensing module" and to the "flow control valve module". The electronic system is also configured to receive the user desired flow rate command input through a input device. The user input device is any one of a user interface or touch pad or key board. The electronic system has a logic control device which is configured to compare the input user desired flow rate to the measured flow rate. Based upon this comparison, the logic control device is configured to send a suitable and appropriate electrical commands to the "flow control valve module" so that the desired flow rate is maintained.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
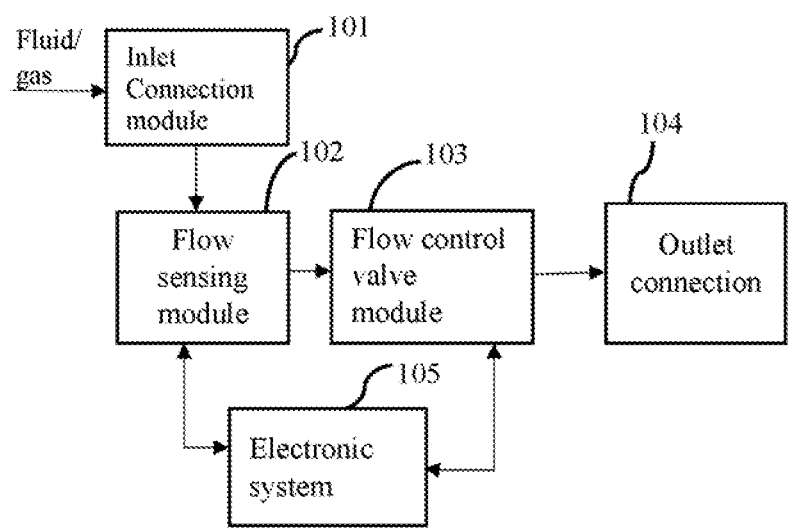
FIG. 1 illustrates a block circuit diagram of a reconfigurable and modular flow control system for fluids with a linear seal arrangement, according to an embodiment herein.

Although the specific features of the embodiments are shown in some drawings and not in others. This is done for convenience only as each feature may be combined with any or all of the other features in accordance with the embodiments.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a precision linear seal system for a flow controller. The precision linear seal system herein is suitable for interconnection of flow controller modules in a liquid or gas flow controller. According to an embodiment herein, the system provides simple linear seal arrangement that requires no manifold, no interconnection tubes and tube fittings. The precision linear seal system for a flow controller enables easy arrangement and replacement of modules in the flow controller. The precision linear seal system for a flow controller provides simple and effective seal between modular components in the flow controller. The precision linear seal system includes a linear track system that is configured to support the inlet connection module, the flow sensing module, the flow control valve module, and the outlet valve module in a linear arrangement. The linear track system for a flow controller includes a dovetail locking configuration. The linear track system for a flow controller utilizes one of a simple two rod or a two screw system to compress the seals between each interface of the modules.

According to an embodiment herein, a reconfigurable, dynamic fluid flow control system for liquids or gases is provided. The system comprises an inlet connection module comprising a fluid inlet to receive a fluid. A flow sensing module is coupled to the inlet connection module. The flow sensing module is configured to measure a flow rate of the fluid to generate a sensor output signal. A flow control valve module is coupled to the flow sensing module. The flow control valve module is configured to provide a desired flow rate. The desired flow rate is set by a user. An outlet connection module is coupled to the flow control valve module. The outlet connection module is configured to deliver the desired flow rate. An electronic control system is configured to regulate an operation of the flow sensing module and the flow control valve module. The electronic control system is configured to receive a user input data and commands through an input device. The electronic control system is configured to receive the user input data and the sensor output signal to generate an output command signal for controlling an operation of the flow control valve to achieve a desired flow rate. A seal system is configured to provide a sealing among an interconnection point between any two of the inlet connection module, the flow sensing module, the flow control valve module, and the outlet valve module to prevent a leakage of fluids. A linear track system is arranged to provide a desired orientation and location of the inlet connection module, the flow sensing module, the flow control valve module and the outlet valve module in a linear arrangement. The linear track system is configured to retain the inlet connection module, the flow sensing module, the flow control valve module, and the outlet valve module with a dovetail locking configuration.

According to an embodiment herein, the linear track system comprises a platform, two stoppers, two rods and screws. The platform is formed in a dovetail locking configuration for receiving and storing each module.

According to an embodiment herein, the dovetail configuration in the linear track is one of angular with sixty degree slope on each side.

According to an embodiment herein, the linear track is formed in a rectangular shape with a recess or track formed in the center. The track is formed in an inverted T shape.

According to an embodiment herein, the linear track system comprises two stoppers provided at distal end of the platform. Each of the two stoppers are provided with two holes for receiving two rods. The two rods are passed through the two stoppers and tightened and fastened with the two stoppers through the two screws to keep a plurality of seals placed between the inlet connection module, the flow sensing module, the flow control valve module, and the outlet valve modules intact and in a compressed condition to maintain a seal integrity.

According to an embodiment herein, the linear track system is fabricated of materials selected from a group consisting of aluminum, steel, fiber reinforced plastics, Polytetrafluoroethylene (PTFE) and brass.

According to an embodiment herein, a bottom surface of each of the inlet connection module, the flow sensing module, the flow control valve module, and the outlet valve module is formed in dovetail configuration for interlocking with the dovetail configuration on the linear track system.

According to an embodiment herein, each of the inlet connection module, the flow sensing module, the flow control valve module, and the outlet valve module is mounted on the linear track system and replaced on demand.

According to an embodiment herein, the seal system comprises a first seal arranged between the inlet connection module and the flow sensing module, a second seal arranged between the flow sensing module and the flow control valve module, and a third seal arranged between the flow control valve module and the outlet valve module.

According to an embodiment herein, the electronic control system comprises a summation logic, a calibration table, a control logic device and a PID control device. The summation logic is designed or configured to receive an input from the user and the flow sensing module.

According to an embodiment herein, the control logic device is configured to compare an input from the summation logic and the flow sensing module calibration table to generate a control signal for achieving the desired flow rate.

According to an embodiment herein, the PID control device is configured to receive the output control signal to generate the output command signal. An opening of the flow control valve is controlled through an actuator or electromagnetic relay based on the output command signal.

According to an embodiment herein, the linear track system is a long metal bar with a dove tail configuration for interlocking each module.

According to an embodiment herein, the input device is selected from a group consisting of touch pad, user interface and key pad.

According to an embodiment herein, a precision linear seal system for a flow controller providing variable flow rate in fluids is disclosed. The system includes an inlet connection module comprising a fluid inlet to receive fluid. The system includes a flow sensing module coupled to the inlet connection module. The flow sensing module is configured to determine the flow rate and generate a sensor signal. The system includes a flow control valve module coupled to the flow sensing module. The flow control valve module is configured to provide a plurality of mutually different flow rates as commanded by a user input. The system includes an outlet connection module coupled to the flow control valve module. The outlet connection module is configured to deliver fluid at a desired rate. The system includes an electronic system coupled to an input module, the flow sensing module, and the flow control valve module. The electronic system is configured to receive the user input from the input module. The electronic system is configured to receive the sensor signal to generate an output signal to program the flow control valve. The system further includes a linear track system that is configured to support the inlet connection module, the flow sensing module, the flow control valve module, and the outlet valve module in a linear arrangement. The linear track system retains the inlet connection module, the flow sensing module, the flow control valve module, and the outlet valve module with a dovetail locking configuration. The linear track system further utilizes a simple two rod and screw system to compress the seals placed between each interface of the modules.

The Flow controller is configured to maintain a consistent and stable known flow rate for fluids (liquids or gases). The Flow controller is configured to receive a command for specific (preset) flow rate or for a specific (preset) total flow of the liquid or gas, to produce a desired flow rate.

The flow control system include the inlet connection module, the outlet connection module, a flow sensing mechanism that produces an electrical signal proportional to the measured or sensed fluid flow rate, and a flow control valve. The flow control valve is adjusted through an actuator or relay which is controlled with a command signal from a control logic. The electronic system servo control device is configured to provide a closed loop control. The input data or setting provided by the user is compared to the value derived from the flow sensor output to send a command to adjust the (proportional) flow control valve to achieve the desired or preset flow rate.

The flow control system comprises an inlet connection for receiving a liquid or gas to the flow controller. The gas or liquid supply or source must be connected to a pressure source to make the fluid to flow into the flow controller through an inlet tube or port. The pressure for the fluid is developed by using a tank of compressed gas, a cover gas with pressure over a liquid container to pressurize the liquid, gravity feed, or a pump feed is used. The pressure source is not part of the flow controller, but is needed to supply the fluid to the flow controller.

Subsequently, the inlet module supplies fluid to the flow sensing module. The flow sensing module measures or estimates the fluid flow rate, and produces an electrical output signal corresponding to the measured flow rate of the fluid. The output fluid flow from the flow sensing module is supplied to the flow control valve module. The flow control valve module includes an adjustable flow restriction or flow control valve capable of adjusting a flow rate to a desired degree or level based on a received command signal from a control logic device. The flow control valve module is provided with at least one of mechanical actuators, to open and close flow passage for a desired fluid (liquid or gas) flow rate. Examples of actuators include but not limited tan electromagnet or solenoid, or piezoelectric, or a motor or other suitable device. The flow control valve module passes the fluid into the Outlet module or port, which further delivers the fluid to the customer flow application.

According to an embodiment herein, the electronic circuit system which is a part of the flow controller, is connected electronically to the "flow sensing module" and to the "flow control valve module". The electronic system is also configured to receive the user desired flow rate command input through a input device. The user input device is any one of a user interface or touch pad or key board. The electronic system has a logic control device which is configured to compare the input user desired flow rate to the measured flow rate. Based upon this comparison, the logic control device is configured to send a suitable and appropriate electrical commands to the "flow control valve module" so that the desired flow rate is maintained.

FIG. 1 illustrates a block circuit diagram of a reconfigurable and modular flow control system for fluids with a linear seal arrangement, according to an embodiment herein. With respect to FIG. 1, the flow control system includes an Inlet connection module 101, a flow sensing module 102, a flow control valve module 103, an Outlet connection 104, and an electronic system 105.

The Inlet connection module 101 is configured or designed to provide a flow tubing or pipe connection to the user, thereby providing an external incoming fluid flow path. A fluid source supply (liquid or gas) is connected to the Inlet connection module 101. The examples of different connections in the inlet connection module 101 include but not limited to a barb connection for soft low pressure tubing, a pipe thread for a tube fitting or threaded pipe, a flare fitting for tubing that accommodates the connection design, or number of other user connection types.

According to an embodiment herein, the fluid passage diameter and material of construction for the "Inlet" is sized to match the specific fluid based on parameters such as pressure supplied, pressure drop due to restriction and flow rates, fluid viscosity, and fluid chemical compatibility.

The Inlet connection module 101 includes a dovetail configuration, which matches and locks into a mechanical linear track. Therefore, the "Input Module" is installed mechanically on the track and is further sealed to the flow controller system. According to an embodiment herein, the "Input Module" configuration is changed to a different "Input" conditions or desired input parameters at any time, in the event that that the user requires to vary a flow connection.

According to an embodiment herein, the flow sensing module 102 is configured to detect and measure the fluid flow rate to generate an electrical output signal proportional to the measured flow rate of the fluid. The existing flow measurement techniques is employed in the design architecture to determine the fluid flow rate. Examples of measurement techniques include differential pressure, turbine wheel, gear, thermal, ultrasonic, Coriolis, vortex, electromagnetic and the like. The electrical output signal is proportional to the fluid flow rate. Each flow Sensor Module is selected for specific flow ranges/characteristics/parameters, chemical compatibility, cost considerations, accuracy, turndown ratio, response speed and pressure drop requirements. According to an embodiment herein, the flow sensing module 102 is easily installed, and changed, or inter-changed as necessary in the linear track system. The electric output signal from the flow sensing module 102 is transmitted to the electronic control system 105. The electronic control system 105 is further configured to control other modules in the flow controller based on the output signal from the flow sensing module 102 and a user input.

According to an embodiment herein, the Flow control valve module 103 is designed or configured to provide an adjustment of flow restriction using flow control valve. The Flow control valve module 103 is configured to provide a plurality of mutually different flow rates (as commanded by) based on the electrical command signal received from the electronic control system. The Flow Control Valve module is controlled by the external electrical signal received from a control logic device in the electronic control system. The Flow control valve module 103 is provided with at least one of mechanical actuators, to open and close a flow passage for the fluid (liquid or gas) suitably to achieve the desired or preset flow rate. Examples of the mechanical actuators include one of an electromagnet, solenoid, piezoelectric, a motor and other suitable device. The flow control valve is configured or designed to control or adjust or vary the fluid flow rate by adjusting/controlling a pinch tube towards an open position or a closed position. According to an embodiment herein, the flow control valve is designed/configured to adjust a diaphragm towards open or closed position, or move a seal area towards open or closed position, or move a tapered needle in and out of a matching housing suitably to restrict or open a flow path. According to an embodiment herein, a ball valve or shutter valve is provided or arranged to open or close the flow rate (or partially do so).

According to an embodiment herein, the Flow Control Valve module is operated in a fast or on-off timer mode so as to modulate the fluid flow rate and control the flow based on the on-off time periods. According to an embodiment herein, the Flow Control Valve is designed to dispense a flow of liquid or gas. The Flow Control Valve is kept in 'OPEN' position during the fluid dispense time, and kept in full 'CLOSED' position as soon as the total flow is completed for the dispense. In aforementioned case, the Valve is not operated as a proportional valve but is kept in 'OPEN' or 'CLOSED' condition (ON or OFF).

According to an embodiment herein, the Outlet Connection Module 104 is designed or configured to provide an output flow tube or pipe connection to the user external outgoing fluid flow path. The fluid exits from the flow controller (liquid or gas) is fed/output to this component. Examples of pipe or tube connections provided in the outlet connection module 104 include but not limited a barb connection for soft low pressure tubing, a pipe thread for a tube fitting or threaded pipe, a flare fitting for tubing that accommodates the connection design, or any number of other user connection types. The passage and size and construction material of the "Outlet" is sized varied based on specific fluid used, the required pressure supplied, pressure drop due to restriction and flow rates, fluid viscosity, and fluid chemical compatibility.

According to an embodiment herein, the outlet connection module 104 includes a dovetail configuration to align with the linear mechanical track and the Outlet connection module 104 is installed mechanically on the linear track and sealed to the flow controller system. The Outlet connection Module 104 is changed easily to another or a different "Outlet" configuration at any time easily, when the user requires another different flow connection.

According to an embodiment herein, the Electronic control system 105 is connected electronically to the flow sensing module and to the flow control valve module. The Electronic control system is also configured to receive the user desired flow rate command electronic signal from the user. Further, the Electronic control system 105 is configured to generate an output signal to adjust or control the flow rate by regulating an operation of valve in the flow control valve module.

The electronic control system 105 is configured to continuously compare the user input or desired flow rate from the user to the actually measured flow rate received from the flow sensing module 102. Based on the comparison, the electronic control system 105 is configured to send an appropriate electrical commands to the "flow control valve module" to adjust and regulate the flow rate through the valve to the desired flow rate so that the commanded flow rate is maintained. The valve is adjusted by the electronic control system to adjust an opening degree of diaphragm in the valve by moving the diaphragm towards one of an open position or closed position to correct the instantaneous flow rate to the desired flow rate level.

According to an embodiment herein, the flow controller is mounted on a linear track system with precision seal. The linear track system is configured to support the inlet connection module, the flow sensing module, the flow control valve module and the outlet valve module in a linear seal arrangement. The linear track system retains the inlet connection module, the flow sensing module, the flow control valve module and the outlet valve module in a dovetail locking configuration. Further, the linear track system further comprises two rod or a two screw system to compress the seals located between each interface arranged between any two adjacent modules.

Figure 3A:
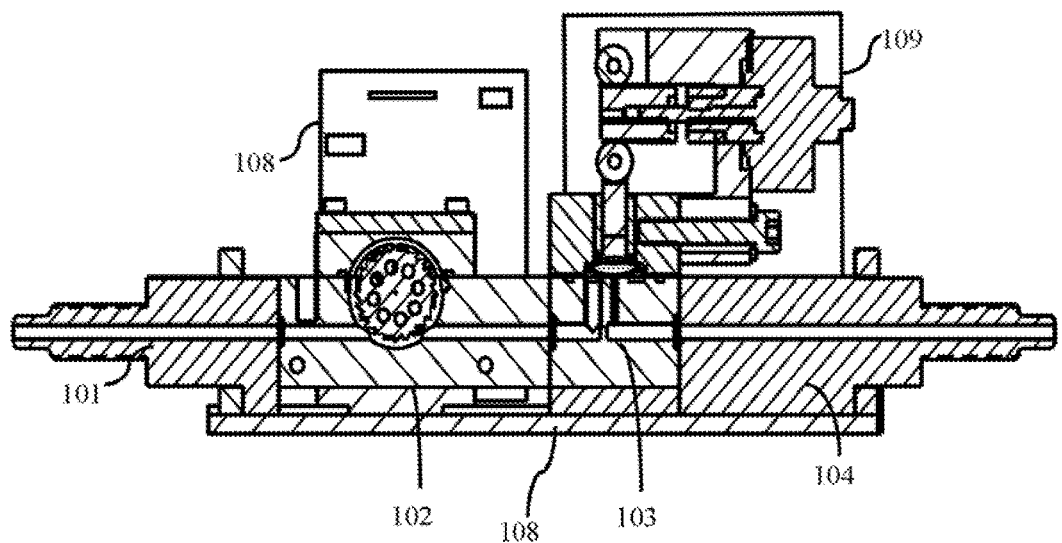
FIG. 3A illustrates a cross sectional view of a reconfigurable and modular flow control system for fluids with a linear precision seal system, according to an embodiment herein.
Figure 3B:
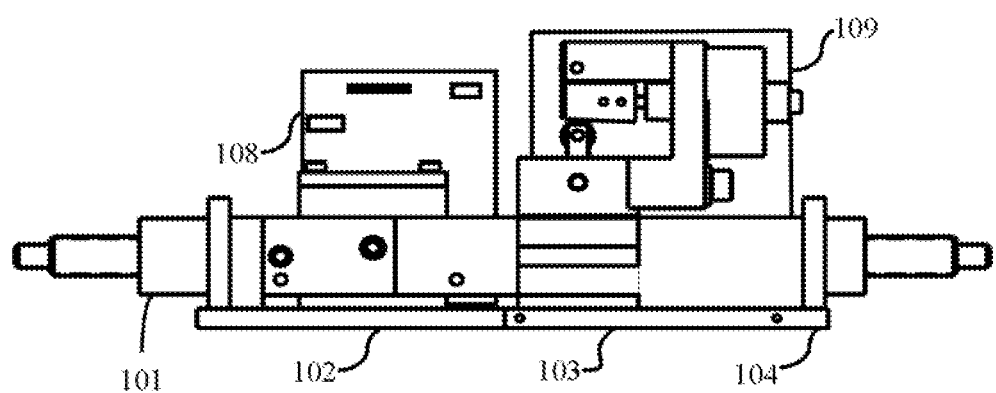
FIG. 3B illustrates a front side view of a reconfigurable and modular flow control system for fluids with a linear precision seal system, according to an embodiment herein.
Figure 3C:
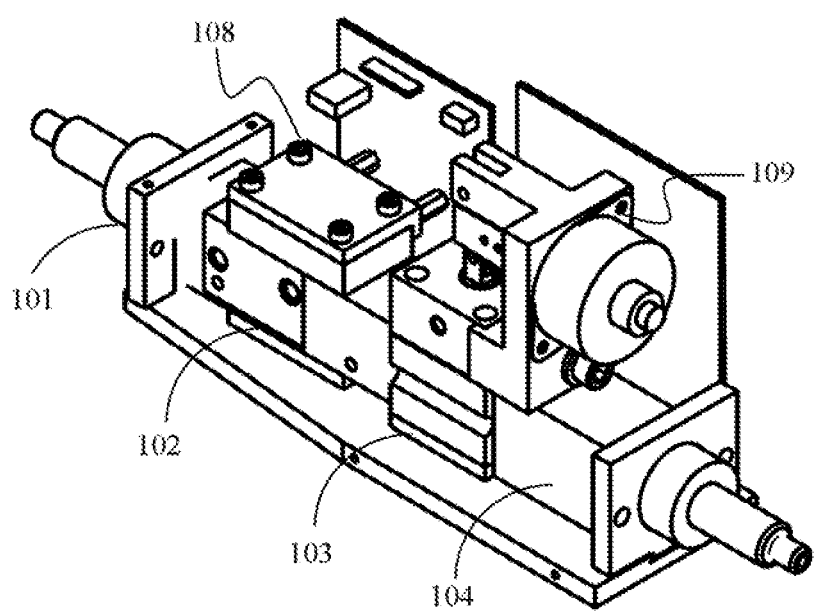
FIG. 3C illustrates a top side perspective view of a reconfigurable and modular flow control system for fluids with a linear precision seal system, according to an embodiment herein.

According to an embodiment herein, a simple two rod or two screw system is used to compress the seals between each interface of the modules after the installation of all modules on the linear track system, as illustrated in FIG. 3C. The engagement of the modules on the track allows for a sliding motion of all the modules mounted on the linear track so as to add, change or remove a module. The linear track system is also designed to provide a correct orientation and location for the seals to produce/form a leak free connection for the fluid flowing through the modules.

Figure 2:
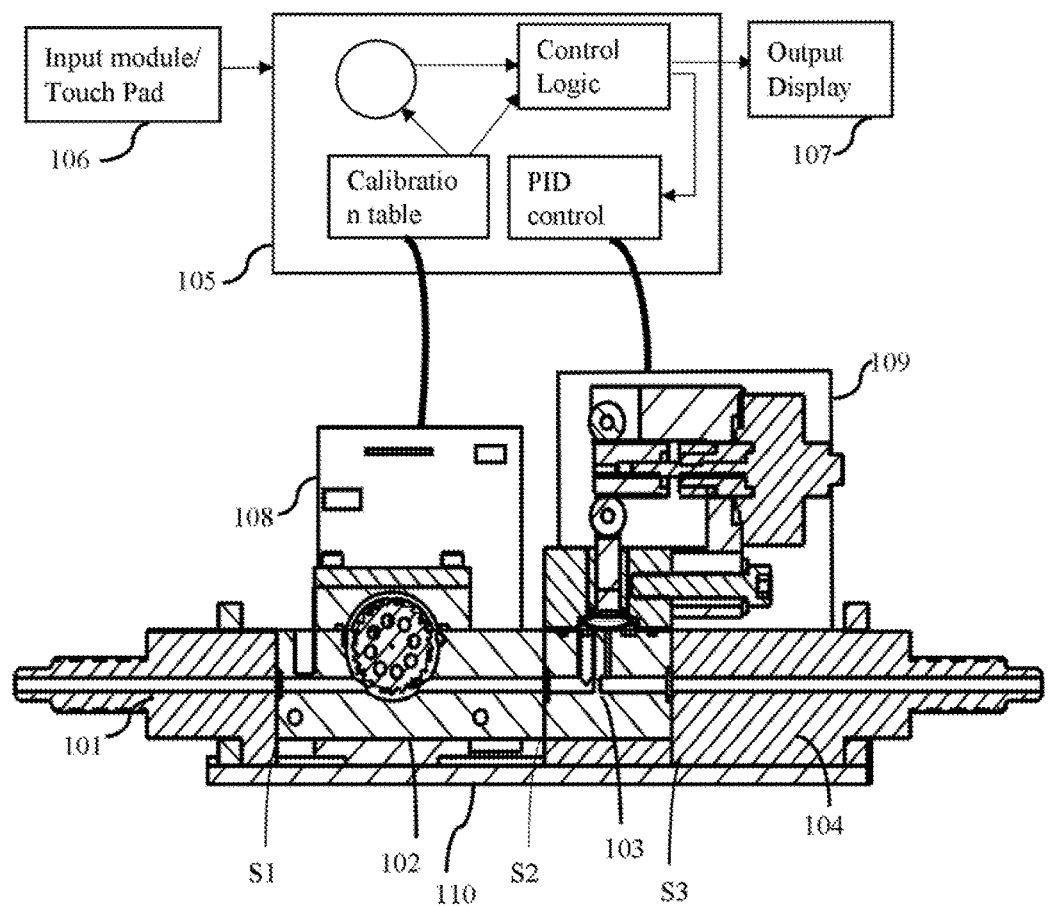
FIG. 2 illustrates a cross sectional view of a reconfigurable and modular flow control system for fluids with a linear seal arrangement along with a functional block diagram of a control system, according to an embodiment herein.

FIG. 2 illustrates a cross sectional view of a reconfigurable and modular flow control system for fluids with a linear seal arrangement along with a functional block diagram of a control system, according to an embodiment herein. With respect to FIG. 2, the Flow controller is designed to maintain a consistent and stable known flow rate for fluids (liquids or gases). The Flow controller receives a command for specific/desired flow rate or for a specific/desired total flow of the liquid or gas, and regulates the flow through the modules to generate the desired flow rate output.

The flow controller system includes the inlet connection module 101, the flow sensing module 102 with sensor electronics module 108, the flow control valve module 103, the outlet connection module 104, and the electronic control system 105. The flow controller further comprises the input module/touch pad 106, the output display 107 and the flow control device. The flow sensing module 102 is designed to produce an electrical signal proportional to the detected or measured fluid flow rate. The flow control valve 103 is adjusted based on a control signal received from the electronic control system 105. The electronic control system 105 has a servo control device to provide a closed loop control. The user is enabled to enter an input command or value through the input module/touch pad 106. The input command signal or the flow rate value from the user is compared with the flow rate value received from the flow sensor to transmit the control signal or control signal data. The control signal data includes an adjustable (proportional) flow control value required to achieve the desired flow rate.

According to an embodiment herein, an analog input is provided to the flow controller with a voltage such as 0 to 5 volts DC, or in some cases 4-20 mA, or 0-10V DC volts represents 0 flow, and 5V represents the full flow 100% of flow range. The Flow controller is also enabled to accommodate a set point that is selected by the user on an input module 106 or built-in touchpad, or from a digital serial connection including a USB or RS485.

The flow control system comprises the inlet connection module 101 which is an inlet port for allowing the entry of liquid or gas in to the flow controller. The gas or liquid is pressurized with a pressure source to make the fluid to flow into the flow controller inlet. The pressure for the fluid is developed/generated by using a tank of compressed gas, a cover gas with pressure over a liquid container to pressurize the liquid, gravity feed, or a pump feed. According to an embodiment herein, the pressure source is not included as a component of the flow controller. However the pressure source is required/needed to supply high-pressure fluid to the flow controller.

Subsequently, the fluid received through the inlet connection module 101 is fed or supplied or passed to the flow sensing module 102. The flow sensing module 102 is designed to detect and measure the fluid flow rate using sensor electronics 108 and produces the electrical output signal corresponding to the detected and measured flow rate of the fluid. The output fluid from the flow sensing module is supplied to the flow control valve module 103. The flow control valve module 103 includes an adjustable flow restriction or flow control valve that is designed/configured to provide a plurality of mutually different fluid flow rates based on the input value or input command received from the user through the user input device. The flow control valve module 103 comprises at least one of mechanical actuators, to open and close a suitable flow passage for the fluid (liquid or gas) flow rate. Examples of actuators include but are not limited to an electromagnet or solenoid, or piezoelectric, or a motor or other suitable device. The flow control valve module 103 passes the fluid into the outlet connection port, which further delivers the fluid to the customer flow application.

According to an embodiment herein, the electronic control system 105 of the flow controller, is communicatively (electronically) connected to the "flow sensing module electronics 108" and to the "flow control valve module electronics 109". The electronic control system 105 is also configured to receive the user desired flow rate through an input command electronic signal. The electronic control system 105 is configured to compare the input desired flow rate to the measured flow rate. Based upon this comparison, the electronic control system is configured to send appropriate command signal to the "flow control valve module" to maintain or achieve a desired flow rate.

The system further comprises a seal system configured to provide a sealing of the inlet connection module, the flow sensing module, the flow control valve module and the outlet valve module to prevent a leakage of fluids. The seal system comprises a first seal S1 arranged between the inlet connection module and the flow sensing module, a second seal S2 arranged between the flow sensing module and the flow control valve module, and a third seal S3 arranged between the flow control valve module and the outlet valve module. The linear track system comprises two rods or two screws secured to the two stoppers provided at the two distal ends of the linear track system. The two rods/two screws are secured to the stoppers after installing all the modules along the linear track system to maintain the integrity of the seals.

Figure 3D:
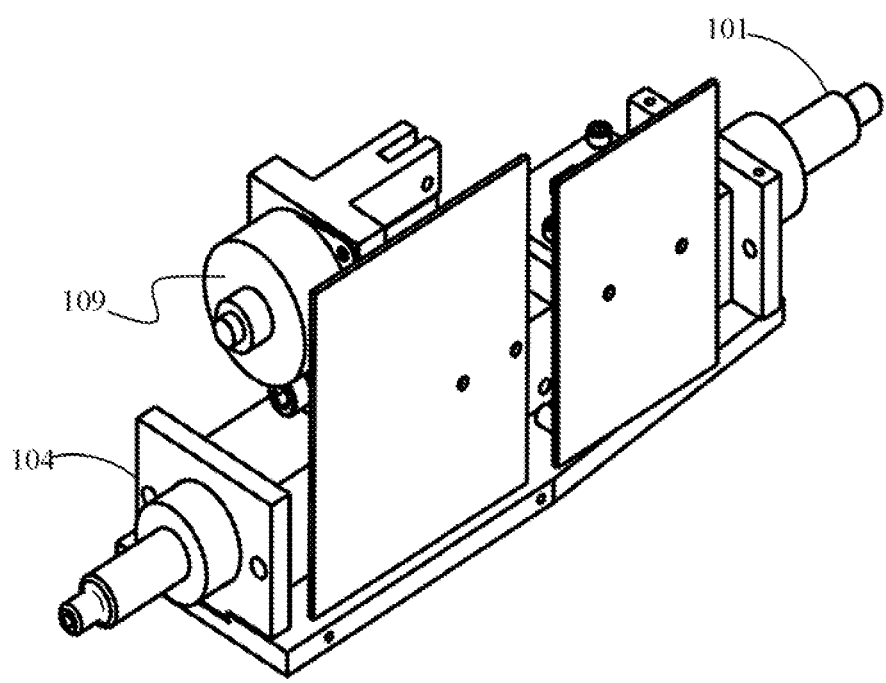
FIG. 3D illustrates a back side view of a reconfigurable and modular flow control system for fluids with a linear precision seal system, according to an embodiment herein.

FIG. 3A illustrates a cross sectional view of a reconfigurable and modular flow control system for fluids with a linear precision seal system, according to an embodiment herein. FIG. 3B illustrates a front side view of a reconfigurable and modular flow control system for fluids with a linear precision seal system, according to an embodiment herein. FIG. 3C illustrates a top side perspective view of a reconfigurable and modular flow control system for fluids with a linear precision seal system, according to an embodiment herein. FIG. 3D illustrates a back side view of a reconfigurable and modular flow control system for fluids with a linear precision seal system, according to an embodiment herein. With respect to FIG. 3A to 3D, the flow controller is mounted on a linear track system with precision seal. The linear track system is configured to support the inlet connection module, the flow sensing module, the flow control valve module and the outlet valve module in a linear arrangement. The linear track system retains the inlet connection module, the flow sensing module, the flow control valve module and the outlet valve module with a dovetail locking configuration. Further, the linear track system further comprises a simple two rod or a two screw system to compress the seals between each interface of any two adjacent modules.

According to an embodiment herein, a simple two rod or two screw system is used to compress the seals between each interface of the modules after the installation of all modules on the linear track system. The engagement on the track allows for a sliding motion so as to add, change or remove a module. The linear track system also establishes correct orientation and location for the seal, so as to produce a leak free connection for the fluid flowing between modules.

The electronic control system part of the flow controller, is communicatively connected to the "flow sensing module" and to the "flow control valve module". The electronic control system is also configured to receive the user input desired flow rate electronic signal. The electronic control system is configured to compare the input desired flow rate to the measured flow rate. Based upon this comparison, the electronic control system is configured to send an appropriate command control signal to the "flow control valve module" to achieve the desired flow rate. The valve is further opened or closed to correct the actual flow rate to achieve the desired input flow rate. The flow control system is operated in a closed loop through the flow sensing feedback system and adjusts the opening of the flow control valve through the actuator or electromagnetic relay to maintain the desired flow rate based on the sensor output signal. This process is performed in a continuous manner to achieve the desired flow rate.

According to an embodiment herein, the flow rate is changed, when the pressure of the fluid source (often is a pump) is changed. When the pump pressure is reduced, then the flow rate is also reduced. As a result, the flow sensor begins to detect the change in the flow rate and sends the detected flow rate to the electronic system. Then the electronic control system is configured to compare the desired flow rate input by the user to the actually measured instantaneous flow rate to sends an open command to the flow controller to open the flow valve (proportionally), until the desired user input flow rate low rate is restored. The new valve flow position is maintained as long as the command and measured flow rates are the same.

According to an embodiment herein, the liquid (or gas) Flow Controller is composed of a variety of materials including Polytetrafluoroethylene (PTFE). PTFE is suitable for a wide variety of liquid chemicals, and is machined with the mating dovetail feature that slides onto the linear track. Further, Peek, HDPE, Kynar, and Nylon are some of the alternative material choices for the Flow Controller. The Flow Controller working on higher temperatures or pressures are constructed of Metal parts such as Stainless steel, aluminum, or other metals. Considerations for chemical compatibility, pressure, temperature and cost are factors for selection of the most suitable material. The Flow Controller is constructed of a mixture of materials, thereby making the flow controller more cost effective. A molded dovetail feature is formed using some plastics for reduced part cost.

According to an embodiment herein, a Flow Controller uses the Linear Seal concept. The seals are made of several materials such as PTFE and fluoroelastomer as shown in FIG. 2 seals S1, S2, S3. PTFE is suitable for a variety of low pressure corrosive gases, and can be machined with the mating dovetail feature that can slide onto the linear track. Metal parts may be desirable for higher temperatures or pressures. Stainless steel, aluminum, or other metals may be used. Also, Peek, HDPE, Kynar, and Nylon are some of the alternative plastic material choices for use with gases.

Figure 3E:
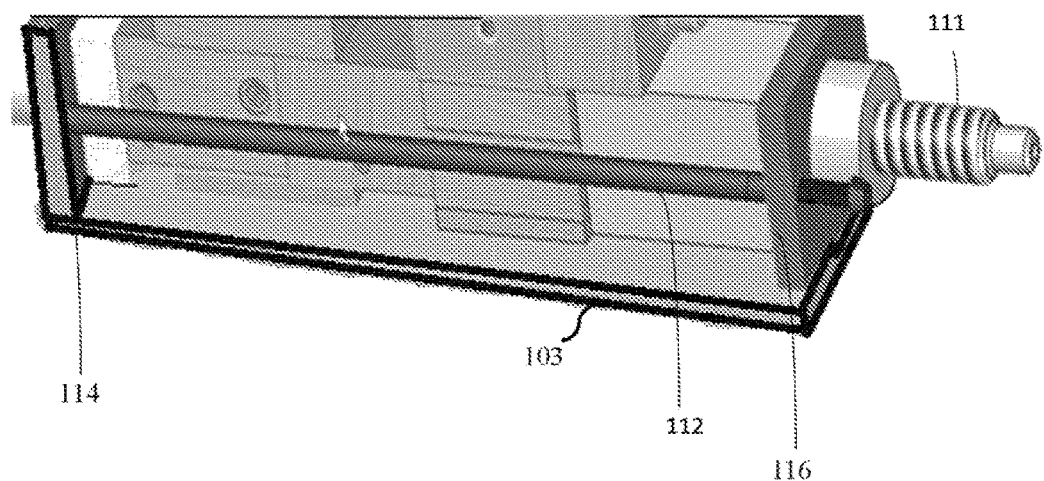
FIG. 3E illustrates a front view of a reconfigurable and modular flow control system for fluids with a linear precision seal system, according to an embodiment herein.

FIG. 3E illustrates a front view of a reconfigurable and modular flow control system for fluids with a linear precision seal system, according to an embodiment herein. With respect to FIG. 3E, the linear precision seal system includes two stoppers 114, 116 provided at distal ends of the platform, and wherein each of the two stoppers are provided with two holes for receiving rods 112, and wherein the rods 112 pass through the two stoppers 114, 116 and tightened and fastened with the two stoppers through the screws 111 to keep a plurality of seals placed between the inlet connection module, the flow sensing module, the flow control valve module, and the outlet valve modules intact and in a compressed condition to maintain a seal integrity.

According to an embodiment herein, the slide track feature engages and supports the various modules in a linear arrangement retaining the modules in a dovetail interlocking configuration. FIG. 3E shows after all modules are installed, then a simple 2 rod/2 screw system is used to compress the seals between each interface of all of the modules at once.

The engagement of the all the modules with the linear track allows for a linear sliding motion, when a module is added, changed or removed. The interlocking engagement is provided to provide the correct precise orientation and location for the seal, so that a leak free connection between each of the modules is produced or achieved.

Figure 4A:
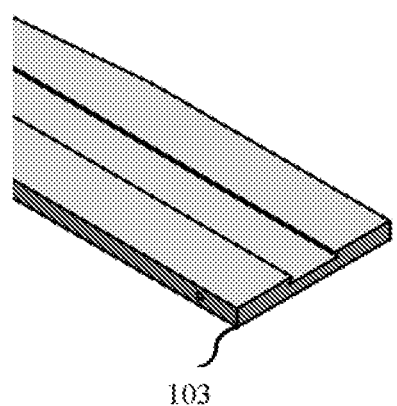
FIG. 4A illustrates a top side partial perspective view of a dovetail linear track in a reconfigurable and modular flow control system for fluids with a linear precision seal system, according to an embodiment herein.
Figure 4B:
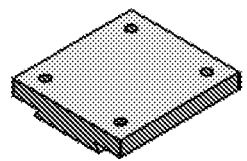
FIG. 4B illustrates a top side perspective view of a mating dovetail feature in a reconfigurable and modular flow control system module, for fluids with a linear precision seal system, according to an embodiment herein.

FIG. 4A is an exemplary illustration of a dovetail linear track on the lower surface of each module (a male dovetail). FIG. 4B is an exemplary illustration of a dovetail linear track on the linear track system and thus interlock in a known precise position (with a female dove tail). Other interlocking track designs may be used that provide the ease of removal and precise location of a seal surface.

The Linear Track System is comprised of the track, which is typically a long metal bar (aluminum) with a precision dovetail cut feature that interlocks with the Flow Controller Modules (each module has the mating dovetail feature at the bottom of the module) as the modules are made to slide onto the track.

The dovetail cut is along the full length of the linear Track. At one end of the track, a mechanical stopper is provided to prevent a motion of the module(s). On the other end of the track, a similar stopper is provided to slide onto the track. The two rods and screws are tightened between the two stoppers to compress the seals in the interface of all modules on the linear track.

The user is enabled or allowed to install a choice of Inlet connection module, a choice of Sensor module, a choice of flow valve, and a choice of the Outlet flow connection module. After tightening the two screws, all seals are compressed to maintain the seal integrity to prevent a leakage of fluid at the intersection of two adjacent modules.

Figures 5A, 5B:
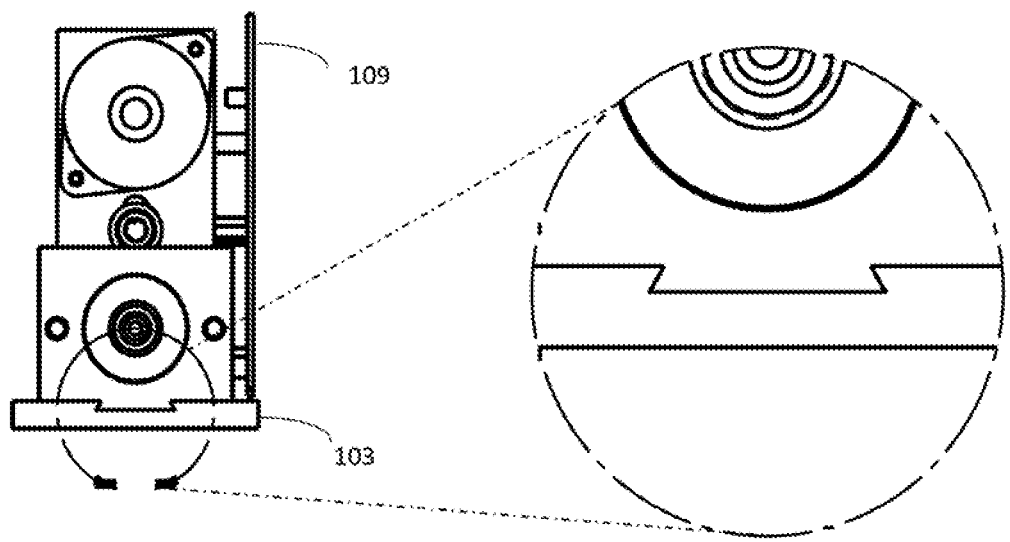
FIG. 5A illustrates a side view of a reconfigurable and modular flow control system for fluids with a linear precision seal system, according to an embodiment herein.
FIG. 5B illustrates a front side enlarged view of a dovetail liner track in a reconfigurable and modular flow control system for fluids with a linear precision seal system, according to an embodiment herein.

FIG. 5A illustrates a side view of a reconfigurable and modular flow control system for fluids with a linear precision seal system, according to an embodiment herein. FIG. 5B illustrates a front side enlarged view of a dovetail liner track in a reconfigurable and modular flow control system for fluids with a linear precision seal system, according to an embodiment herein. According to an embodiment herein, the track dovetail includes a 60 degree slope on each side of the internal track feature, and bottom surface of each module include a mating 60 degrees. The modules slide on the linear track, while maintaining a precise seal location when sealed. Other variations of this interlocking track seal include dovetail variations, different angles, width of the track, or radius versions of the dovetail. Certain dovetail configurations include lubrication on the track region to facilitate easy sliding of a module along the track.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications.

Although the embodiments herein are described with various specific embodiments, it will be obvious for a person skilled in the art to practice the embodiments herein with and without modifications.

What is claimed is:
1. A reconfigurable, dynamic fluid flow control system for liquids or gases, the system comprising:
   an inlet connection module comprising a fluid inlet to receive a fluid;
   a flow sensing module coupled to the inlet connection module, and wherein the flow sensing module is configured to measure a flow rate of the fluid to generate a sensor output signal;

a flow control valve module coupled to the flow sensing module, wherein the flow control valve module is configured to provide a desired flow rate, and wherein the desired flow rate is set by a user;

an outlet connection module coupled to the flow control valve module, wherein the outlet connection module is configured to deliver the desired flow rate;

an electronic control system configured to regulate an operation of the flow sensing module and the flow control valve module, wherein the electronic control system is configured to receive a user input data and commands through an input device, and wherein the electronic control system is configured to receive the user input data and the sensor output signal to generate an output command signal for controlling an operation of the flow control valve to achieve a desired flow rate;

a seal system comprising a plurality of seals configured to provide a sealing among an interconnection point between any two of the inlet connection module, the flow sensing module, the flow control valve module, and the outlet connection module to prevent a leakage of fluids;

a linear track system arranged to provide a desired orientation and location of the inlet connection module, the flow sensing module, the flow control valve module and the outlet connection module in a linear arrangement, and wherein the linear track system is configured to retain the inlet connection module, the flow sensing module, the flow control valve module, and the outlet connection module with a dovetail locking configuration, and wherein the linear track system comprises two rods and two screws, and two stoppers provided at distal ends of a platform, and wherein each of the two stoppers are provided with two holes for receiving two rods, and wherein the two rods are passed through the two stoppers and tightened and fastened with the two stoppers through the two screws to keep the plurality of seals placed between the inlet connection module, the flow sensing module, the flow control valve module, and the outlet connection modules intact and to compress the plurality of seals to maintain a seal integrity.

2. The system as claimed in claim 1, wherein the dovetail configuration in the linear track has a sixty degree slope on each side.

3. The system as claimed in claim 1, wherein the linear track is formed in a rectangular shape with a recess formed in the center, and wherein the recess is formed in an inverted T shape.

4. The system as claimed in claim 1, wherein the linear track system is fabricated of materials selected from a group consisting of aluminum, steel, fiber reinforced plastics, Polytetrafluoroethylene (PTFE) and brass.

5. The system as claimed in claim 1, wherein a bottom surface of each of the inlet connection module, the flow sensing module, the flow control valve module, and the outlet connection module is formed in dovetail configuration for interlocking with the dovetail configuration on the linear track system.

6. The system as claimed in claim 1, wherein each of the inlet connection module, the flow sensing module, the flow control valve module, and the outlet connection module is mounted on the linear track system and replaced on demand.

7. The system as claimed in claim 1, wherein the seal system comprises a first seal arranged between the inlet connection module and the flow sensing module, a second seal arranged between the flow sensing module and the flow control valve module, and a third seal arranged between the flow control valve module and the outlet connection module.

8. The system as claimed in claim 1, wherein the electronic control system comprises a summation logic, a calibration table, a control logic device and a PID control device, and wherein the summation logic is designed or configured to receive an input from the user and the flow sensing module.

9. The system as claimed in claim 8, wherein the control logic device is configured to compare an input from the summation logic and the flow sensing module calibration table to generate a control signal for achieving a desired flow rate.

10. The system as claimed in claim 8, wherein the PID control device is configured to receive the output control signal to generate the output command signal, and wherein an opening of the flow control valve is controlled through an actuator or electromagnetic relay based on the output command signal.

11. The system as claimed in claim 1, wherein the linear track system is a long metal bar with a dove tail configuration for interlocking each module.

12. The system as claimed in claim 1, wherein the input device is selected from a group consisting of touch pad, user interface and key pad.

* * * * *